(12) United States Patent
Inoue et al.

(10) Patent No.: US 10,183,895 B2
(45) Date of Patent: Jan. 22, 2019

(54) METHOD FOR SUPPRESSING REAR FACE OXIDATION OF CARBON-CONTAINING REFRACTORY, LINING STRUCTURE, AND CARBON-CONTAINING REFRACTORY

(71) Applicant: JFE STEEL CORPORATION, Tokyo (JP)

(72) Inventors: Akihiko Inoue, Chiba (JP); Yoshisato Kiyota, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 380 days.

(21) Appl. No.: 15/110,803

(22) PCT Filed: Jan. 6, 2015

(86) PCT No.: PCT/JP2015/000016
§ 371 (c)(1),
(2) Date: Jul. 11, 2016

(87) PCT Pub. No.: WO2015/105039
PCT Pub. Date: Jul. 16, 2015

(65) Prior Publication Data
US 2016/0340262 A1    Nov. 24, 2016

(30) Foreign Application Priority Data
Jan. 10, 2014 (JP) .................. 2014-002878

(51) Int. Cl.
*C04B 41/50* (2006.01)
*C04B 41/85* (2006.01)
(Continued)

(52) U.S. Cl.
CPC ............ *C04B 41/5089* (2013.01); *B05D 7/50* (2013.01); *C04B 41/009* (2013.01); *C04B 41/85* (2013.01); *F27D 1/0006* (2013.01)

(58) Field of Classification Search
CPC ..... C04B 41/5089; C04B 4/009; C04B 41/85; B05D 7/50; F27D 1/0006
(Continued)

(56) References Cited

U.S. PATENT DOCUMENTS 4,567,103 A * 1/1986 Sara .................. C04B 41/009
                                                106/623
5,102,700 A * 4/1992 Baldi .................. B22F 7/002
                                                216/100
(Continued)

FOREIGN PATENT DOCUMENTS

CN       1148376 A      4/1997
EP     0 773 203 A1     5/1997
(Continued)

OTHER PUBLICATIONS

Jun. 28, 2016 Office Action issued in Japanese Patent Application No. 2015-530196.
(Continued)

*Primary Examiner* — Stephen M Gravini
(74) *Attorney, Agent, or Firm* — Oliff PLC (57) ABSTRACT

Provided is a method for suppressing rear face oxidation and a lining structure, with which high airtightness and a great effect of suppressing rear face oxidation are obtained. The method for suppressing rear face oxidation of a carbon-containing refractory includes forming an adherent layer on a rear face of a carbon-containing refractory by applying an alkali metal silicate aqueous solution to the rear face and solidifying the alkali metal silicate aqueous solution. The alkali metal silicate aqueous solution contains an alkali metal oxide $R_2O$ (R is an alkali metal element) and $SiO_2$ and has a molar ratio of $SiO_2$ to the alkali metal oxide of 2.3 or more. The carbon-containing refractory is used at a high
(Continued)

temperature of 400° C. or more and contains 1 mass % or more of carbon or a carbon compound.

20 Claims, 3 Drawing Sheets (51) Int. Cl.
*C04B 41/00* (2006.01)
*F27D 1/00* (2006.01)
*B05D 7/00* (2006.01)

(58) Field of Classification Search
USPC .......................................................... 110/338
See application file for complete search history.

(56) References Cited

U.S. PATENT DOCUMENTS

| | | | | |
|---|---|---|---|---|
| 6,227,127 B1* | 5/2001 | Yamaguchi | ............ | C04B 35/443 110/323 |
| 6,352,790 B1* | 3/2002 | Eaton | ..................... | C04B 41/009 428/446 |
| 6,401,633 B2* | 6/2002 | Baudhuin | ............... | F23G 5/006 110/185 |
| 8,109,218 B2* | 2/2012 | Chapman | ................ | F23G 5/006 110/346 |
| 10,017,425 B2* | 7/2018 | Tuertscher | ............ | C04B 35/573 |
| 2005/0051057 A1* | 3/2005 | Evans | ................... | C04B 41/009 106/287.34 |
| 2009/0081106 A1* | 3/2009 | Schumann | ............ | C04B 35/565 423/345 |
| 2012/0222354 A1* | 9/2012 | Chen | ..................... | F27D 1/0006 48/87 |
| 2012/0304904 A1* | 12/2012 | Decker | ................. | C04B 28/344 110/338 |
| 2013/0224471 A1* | 8/2013 | Sheedy | ................... | C04B 41/81 428/312.6 |
| 2015/0136001 A1* | 5/2015 | Hoyt | ....................... | F27D 1/004 110/338 |
| 2015/0291805 A1* | 10/2015 | Nicolaus | ................. | C04B 41/85 427/380 |
| 2016/0115086 A1* | 4/2016 | Tuertscher | ............ | C04B 35/573 264/29.1 |
| 2016/0122249 A1* | 5/2016 | Soudier | ................. | C04B 35/443 501/109 |
| 2016/0130188 A1* | 5/2016 | Louchet | .................. | C04B 41/52 428/448 |
| 2016/0214907 A1* | 7/2016 | Shim | ...................... | C04B 41/009 |
| 2016/0340262 A1* | 11/2016 | Inoue | .................... | C04B 41/009 |

FOREIGN PATENT DOCUMENTS

| | | |
|---|---|---|
| JP | H03-242369 A | 10/1991 |
| JP | H11-201652 A | 7/1999 |
| JP | 2000-313682 A | 11/2000 |
| JP | 2001-317880 A | 11/2001 |
| JP | 2005-089271 A | 4/2005 |
| JP | 4648163 B2 | 3/2011 |
| KR | 20040020160 A | 3/2004 |
| KR | 10-1236300 B1 | 2/2013 |
| WO | 2013/161721 A1 | 10/2013 |

OTHER PUBLICATIONS

Dec. 13, 2017 Office Action issued in Korean Patent Application No. 10-2016-7021705.
Apr. 7, 2015 Search Report issued in International Patent Application No. PCT/JP2015/000016.
Mar. 1, 2017 Office Action issued in Chinese Patent Application No. 201580004113.1.
Jun. 14, 2018 Notice of Allowance issued in Korean Patent Application No. 10-2016-7021705.

* cited by examiner

REAR FACE SIDE          END FACE ON
                        REAR FACE SIDE 20 mm

WORKING FACE SIDE

METHOD FOR SUPPRESSING REAR FACE OXIDATION OF CARBON-CONTAINING REFRACTORY, LINING STRUCTURE, AND CARBON-CONTAINING REFRACTORY

TECHNICAL FIELD

The present disclosure relates to methods for suppressing rear face oxidation of carbon-containing refractories and lining structures, both used in facilities such as a melting furnace and a heating furnace.

BACKGROUND ART

In facilities, such as a melting furnace and a heating furnace, in which the internal temperature reaches high temperatures of 400° C. or more, the inner walls of facilities include cooling panels or refractories. The inner walls of facilities emphasizing suppression of heat dissipation include refractories.

Regarding the lining structure of the inner wall of a melting furnace, a heating furnace, and the like, for example, a molten-steel ladle is provided with a wear refractory on the working face serving as the heating surface of refractories to be in contact with molten steel. The face of the wear refractory opposite the working face is called a rear face. A permanent lining refractory is provided on the rear face side of the wear refractory. The side of the permanent lining refractory opposite the wear refractory is further provided with an outer steel shell.

When there is a concern about damage due to thermal shock caused by a large temperature change, when there is a concern about erosion by a reactive gas or a molten product, or when a refractory is used for applications in a reducing atmosphere, carbon, such as graphite or carbon black, or a carbon compound, such as silicon carbide, pitch, or phenol resin, is typically added to the refractory at 1 mass % or more as a measure to improve the durability of the refractory. In this specification, a refractory containing such carbon or such a carbon compound is generally called a carbon-containing refractory. Adding carbon and/or a carbon compound to a refractory can improve the durability of the refractory by taking advantage of the high thermal conductivity of carbon and the carbon compound, a large angle of contact with oxide melt, a high filling property, and the binder effect on a refractory component.

When a carbon-containing refractory is used, the rear face is oxidized and an oxidized layer is formed on the rear face side of the carbon-containing refractory. Hereinafter, oxidation on the rear face side is called rear face oxidation, and the oxidized layer formed on the rear face side is called a rear-face oxidized layer. The working face of the refractory wears due to contact with slag on the working face side of the refractory. At this time, in the refractory containing carbon or a carbon compound, carbon or the carbon compound is oxidized and eliminated even inside the rear face and, as a result, the porosity of the oxidized layer increases according to the amount of carbon decreased. When wearing proceeds and the working face of the refractory reaches the oxidized layer on the rear face side, the refractory wears rapidly, which may cause a problem.

In contrast, in Patent Literature 1, a measure has been taken by generating a difference between the proportion of an antioxidant on the working face side and that on the rear face side of the carbon-containing refractory, namely, changing the composition of a refractory in the lining thickness direction. In Patent Literature 2, there has been proposed a method for inhibiting rear face oxidation of a carbon-containing refractory. The method includes placing a refractory protection sheet formed of a metal plate between an outer steel shell and the refractory.

CITATION LIST

Patent Literature

PTL 1: Japanese Unexamined Patent Application Publication No. 03-242369
PTL 2: Japanese Unexamined Patent Application Publication No. 2001-317880

SUMMARY OF INVENTION

Technical Problem

However, the method for changing the composition of the carbon-containing refractory in the lining thickness direction in Patent Literature 1 is not easily achieved in an industrial context. In addition, wear proceeds in the thickness direction of the refractory lining as the operating time increases. In order to avoid the part designed to have a composition intended for use at low temperatures from serving as the working face, the residual thickness of the refractory needs to be larger at the end of the service life of the refractory than that of an ordinary refractory, the composition of which does not change in the lining thickness direction. That is, the part intended for use at low temperatures cannot withstand high temperatures, and the refractory thus needs to be repaired. Therefore, in Patent Literature 1, there are problems of increased costs during refractory production and increased costs during use.

The method for placing a refractory protection sheet formed of a metal plate or formed of a metal plate attached to a flexible sheet on the rear face side of the carbon-containing refractory in Patent Literature 2 has a problem of having an insufficient effect of suppressing rear face oxidation. This is because of the following reason: if even small gaps remain between the rear face of the refractory and the refractory protection sheet, outside air easily enters the gaps; or the flexible sheet with which the gaps are to be filled has unsatisfactory performance.

The disclosed embodiments have been made in light of such problems, and an object of the present disclosure is to provide a method for suppressing rear face oxidation of a carbon-containing refractory and to provide a lining structure, both the method and lining structure with which a sufficient effect of suppressing rear face oxidation is obtained.

Solution to Problem

The disclosed embodiments may include the following features.

[1] A method for suppressing rear face oxidation of a carbon-containing refractory comprises forming a adherent layer on a rear face of a carbon-containing refractory by applying an alkali metal silicate aqueous solution to the rear face and then solidifying the alkali metal silicate aqueous solution, the alkali metal silicate aqueous solution containing an alkali metal oxide $R_2O$ (R is an alkali metal element) and $SiO_2$ and having a molar ratio of $SiO_2$ to the alkali metal oxide of 2.3 or more, the rear face being located opposite to a working face, the carbon-containing refractory being used at a high temperature of 400° C. or more and containing 1 mass % or more of carbon or a carbon compound.

[2] In the method for suppressing rear face oxidation of a carbon-containing refractory according to [1], the alkali metal silicate aqueous solution has a viscosity of 10 mPa·s or less.

[3] The method for suppressing rear face oxidation of a carbon-containing refractory according to [1] or [2] further comprises installing the refractory into a facility 30 minutes or more after completing the application of the alkali metal silicate aqueous solution, the refractory being provided with the solidified alkali metal silicate aqueous solution.

[4] In the method for suppressing rear face oxidation of a carbon-containing refractory according to any one of [1] to [3], the alkali metal silicate aqueous solution comprises at least one of sodium silicates No. 2 and No. 3 specified in Japanese Industrial Standard JIS K1408-1966, and sodium silicate No. 4.

[5] In the method for suppressing rear face oxidation of a carbon-containing refractory according to any one of [1] to [3], the alkali metal silicate aqueous solution is a potassium silicate aqueous solution.

[6] In the method for suppressing rear face oxidation of a carbon-containing refractory according to any one of [1] to [5], the application of the alkali metal silicate aqueous solution is conducted by applying to the rear face of the refractory two or more times.

[7] In the method for suppressing rear face oxidation of a carbon-containing refractory according to any one of [1] to [6], the adherent layer of the alkali metal silicate after solidification has a thickness of 0.1 mm or more and 0.4 mm or less.

[8] A lining structure comprises a carbon-containing refractory used at a high temperature of 400° C. or more and containing 1 mass % or more of carbon or a carbon compound, wherein the carbon-containing refractory is provided with, on its rear face, a solid adherent layer of an alkali metal silicate, the rear face being located opposite a working face, wherein the molar ratio of $SiO_2$ present in the alkali metal silicate to an alkali metal oxide $R_2O$ (R is an alkali metal element) present in the alkali metal silicate is 2.3 or more.

[9] In the lining structure according to [8], the solid adherent layer of the alkali metal silicate has a thickness of 0.1 mm or more and 0.4 mm or less.

[10] A carbon-containing refractory comprises 1 mass % or more of carbon or a carbon compound and having a solid adherent layer of an alkali metal silicate on at least one face that is to be a rear face, which is located opposite to a working face during use, wherein the molar ratio of $SiO_2$ present in the alkali metal silicate to an alkali metal oxide $R_2O$ (R is an alkali metal element) present in the alkali metal silicate is 2.3 or more.

[11] In the carbon-containing refractory according to [10], the solid adherent layer of the alkali metal silicate has a thickness of 0.1 mm or more and 0.4 mm or less.

Advantageous Effects of Invention

According to the present disclosure, there is provided a method for suppressing rear face oxidation and a lining structure, both with which high airtightness and a great effect of suppressing rear face oxidation are obtained.

DESCRIPTION OF EMBODIMENTS

Embodiments of the present disclosure will be described below with reference to the accompanying drawings.

[Details]

As an attempt to suppress the oxidation of the rear face side of a carbon-containing refractory, what controlled the oxidation rate of the carbon-containing refractory was investigated. This is because the oxidation rate of the carbon-containing refractory, namely, the oxidation rate of carbon in the refractory, is commonly considered to be controlled by either the carbon oxidation reaction rate or the oxygen supply rate. The carbon oxidation reaction rate increases as the temperature increases. The oxygen supply rate is known to increase at a face in contact with outside air. In this description, the rear face of the carbon-containing refractory is the face of the refractory closer to an outer steel shell.

A used refractory of a molten-steel ladle in an iron mill was collected and examined. The carbon-containing refractory was oxidized to a depth of about 1 mm from the working face toward the rear face side and to a depth of about several tens of millimeters from the rear face toward the working face side. It was observed that the density of the refractory increased and the oxidation resistance increased due to partial fusion of an oxide-based refractory component in an oxidized layer on the working face side and the surrounding area, whereas the porosity increased in an oxidized layer on the rear face side.

That is, on the working face side of the carbon-containing refractory, the oxidation of carbon in the refractory was suppressed by an increase in air-flow resistance due to the partial fusion of the oxide-based refractory component. However, on the rear face side (outer steel shell side) having a low temperature, the partial fusion of the oxide-based refractory component did not occur, so that carbon was readily oxidized and the oxidation proceeded to a deep area.

Therefore, the following was considered: on the rear face side, the densification of the refractory did not proceed due to low temperature, and the porosity increased due to the oxidation of carbon in the refractory to cause a reduction in air-flow resistance and further to cause oxygen to enter a deep area, resulting in enlargement of the oxidized layer. That is, even on the working face having a high temperature at which the carbon oxidation reaction rate is high, the refractory was not relatively oxidized when the refractory was densified, which suggests that the oxygen supply rate rather than the carbon oxidation reaction rate controlled the carbon oxidation rate.

These investigation results led to the conclusion that, increasing the airtightness of the face to be in contact with oxygen (outside air), namely, increasing the oxygen (outside air)-flow resistance by performing coating or the like is effective for suppressing rear face oxidation of the refractory without having any composition change, as in Patent Literature 1, which degrades the performance of the refractory on the working face.

Although a method for covering the rear face of the carbon-containing refractory with a refractory protection sheet is publicly known (Patent Literature 2), satisfactory performance cannot be obtained unlike as mentioned above. Therefore, in order to obtain sufficient performance and to find a method that is easier and less expensive than the method disclosed in Patent Literature 2, a mortar, which was commonly used to fill joints in a refractory, was applied to the rear face with a trowel during refractory installation in a molten-steel ladle in an iron mill and the conditions of the rear-face oxidation were determined, for example, when partial repair was performed.

After one month of use, a portion of the refractory having a rear face to which the mortar was applied with a trowel was collected and examined when partial repair was performed on a deeply eroded region (first partial repair). An area of the refractory to which the mortar was not applied was oxidized from the rear face to a depth of 20 mm, whereas the depth of rear face oxidation in an area to which the mortar was applied was reduced by half to about 10 mm.

However, when the same investigation was carried out after another one month of use (in the second partial repair), an area of the refractory to which the mortar was not applied was oxidized from the rear face to a depth of 30 mm, whereas the oxidation depth in an area to which the mortar was applied was 25 mm. These oxidation depths were substantially the same. At this time, the mortar, which was applied to the rear face of the carbon-containing refractory, adhered to a permanent lining refractory between the carbon-containing refractory and an outer steel shell, and interspaces were formed between the mortar and the rear face of the carbon-containing refractory. The reason for this is probably as follows: the permanent lining refractory, which had higher porosity and larger surface roughness than those of the carbon-containing refractory, had stronger adhesion to the mortar and, when the carbon-containing refractory shrunk as a result of cooling for partial repair after operation, mortar was separated from the rear face of the carbon-containing refractory with the permanent lining refractory onto which the mortar attached.

As described above, after the first partial repair, an airtight effect of the mortar on the rear face of the carbon-containing refractory may have been lost, and the rear face oxidation may have proceeded.

Next, an attempt was made to increase the adhesive strength between the carbon-containing refractory and the mortar by pre-application of the same mortar three days before refractory installation instead of trowel-application of the mortar to the rear face during stack installation of the carbon-containing refractory. However, in contrast to the case that the mortar was applied during refractory installation where the mortar was compressed and spread between the refractory and the permanent lining refractory, pre-application of the mortar to the rear face of the refractory generated uneven thickness and an excess or a deficiency of the mortar in corner portions and, as a result, dense installation was difficult. In the second partial repair after another one month of use, in an area to which the mortar was not applied, a portion extending from the rear face to a depth of 30 mm was oxidized, whereas the depth of rear face oxidation in an area to which the mortar was applied was reduced by half to about 15 mm. However, the need for further reduction in the rate of rear face oxidation and the difficulty in installation hindered practical use of the method for inhibiting rear face oxidation by mortar application as described above in actual operation.

The case of using mortar application revealed that, in the process for applying a material that provides any airtightness to the rear face of the carbon-containing refractory, the material adhered more strongly to the permanent lining refractory having larger surface roughness when the material was applied during refractory installation, and the material was separated from the rear face of the carbon-containing refractory when the refractory shrunk as a result of cooling after use. Here, applying the material to the rear face of the refractory before stack installation and performing stack installation after a certain degree of solidification were considered effective. Besides, even if a material applied to the rear face of the carbon-containing refractory remained adhered to the rear face, using a mortar as a application material decreased oxidation to only half. Therefore, there has been a need to find a denser material that provides better airtightness.

The porosity of the carbon-containing refractory whose rear face oxidation was to be suppressed was, for example, 12% before carbon was oxidized, and 18% after carbon was oxidized. Therefore, a material to be applied for oxidation suppression needs to have much lower porosity and provide higher airtightness than the carbon-containing refractory. However, a material, such as the mortar described above, which has plasticity obtained by adding water to refractory component particles having high strength and high elasticity has a disadvantage in that the porosity increases as attached water and water of crystallization decompose and evaporate during use at high temperature.

That is, the following four functions are considered important in the selection of a material to be applied for oxidation suppression: (1) in order to increase the adhesion to the surface of the carbon-containing refractory, the material has good fluidity and adhesiveness at the time of application; (2) in order to increase the adhesion to the carbon-containing refractory compared with the adhesion to the permanent lining refractory, the material is solidified to a certain degree and the spreadability and adhesivity decrease before stack installation of the refractory after application of the material; (3) in order to maintain high airtightness even during use at high temperature, no pores are formed and the denseness and airtightness are maintained even if a solvent evaporates or decomposes at high temperature; and (4) in order not to significantly impair the performance of the refractory during use at high temperature, the material does not degrade the refractory, or the material that cause degradation is used in such a trace amount that an adverse effect is substantially not exerted.

Therefore, regarding the properties of the material to be applied for oxidation suppression, a material containing solid particles having high strength and high elasticity is considered unsuitable, and an amorphous material that keeps its plasticity until solidification is completed at high temperature is considered suitable in order to satisfy function (3) mentioned above. However, application materials and adhesives for use at high temperature which are commonly distributed in the market are resin-based materials and contain an organic compound as a main agent or a solvent. These application materials and adhesives are amorphous but were found to deteriorate and embrittle like carbon at 400° C. or more at which a problem of carbon oxidation arises, which causes cracks and separation and thus results in the loss of airtightness.

Here, oxide-based amorphous materials are considered as amorphous materials that are stable even at high temperature, and oxides of Si, Al, B, and P, which are known as glass network formers, are listed as candidates. As solvents that favorably induce solation of these amorphous oxides and provide fluidity, water or alcohols such as ethanol and ethylene glycol are considered preferable because they generate no residue at high temperature in either an oxidizing atmosphere or reducing atmosphere.

Examples of materials that satisfy these requirements include alkaline metal silicate aqueous solutions. A sodium silicate aqueous solution, which is an alkaline metal silicate aqueous solution, has been conventionally added as a binder to mortar or sand molds for casting. However, the $SiO_2$ and $Na_2O$ present in sodium silicate are known as components that significantly degrade the performance of the refractory because the $SiO_2$ and $Na_2O$ cause changes in the properties, such as melting point reduction or expansion, of the refractory which needs to have higher refractoriness, for example, like a wear refractory for use in transportation of molten iron and molten steel in the steel industry.

However, since increasing only the airtightness of the face of the refractory to be in contact with oxygen has been found to be sufficient in order to suppress the rear face oxidation of the refractory as described above, it is conceived that disadvantages of the $SiO_2$ and $Na_2O$ present in sodium silicate possibly become insignificant if a very thin application with a uniform thickness is achieved by reducing the amount of sodium silicate used to be as small as possible until the $SiO_2$ and $Na_2O$ exert substantially no adverse effect on the refractory, and such a coating provides airtightness.

Here, an attempt to suppress rear face oxidation was made by applying a sodium silicate aqueous solution to the rear face of a carbon-containing refractory. Each of a commercially available aqueous solution of sodium silicate No. 3 (29 mass % of $SiO_2$, 9.5 mass % of $Na_2O$ (based on the mass of the aqueous solution, the same applies to the following)) and an aqueous solution of sodium silicate No. 4 (24.5 mass % of $SiO_2$, 7.5 mass % of $Na_2O$) was applied to the rear face of the carbon-containing refractory by using a brush. The aqueous solution of sodium silicate No. 3 is an aqueous solution containing 28 to 30 mass % of $SiO_2$, 9.0 to 10.0 mass % of $Na_2O$, and unavoidable impurities based on the mass of the aqueous solution, as specified in Japanese Industrial Standard JIS K1408-1966. The aqueous solution of sodium silicate No. 4 is in accordance with manufacturer product specifications and is typically an aqueous solution containing 23.5 to 25.5 mass % of $SiO_2$, 7.0 to 8.0 mass % of Na2O, and unavoidable impurities based on the mass of the aqueous solution and having a molar ratio of $SiO_2$ to Na2O of 3.3 to 3.5.

As the carbon-containing refractory, 284 bricks 230 mm in length, 100 mm in width, and 81 mm in height were used. The aqueous solution of sodium silicate No. 3 (1.0 liter) and the aqueous solution of sodium silicate No. 4 (1.0 liter) were applied to the rear face (total area: 2.3 $m^2$) of the refractory. The calculated thickness at the time of application was 0.4 mm (the calculated thickness here is the value obtained by dividing the volume of the applied aqueous solution by the application area).

At the time of application, sodium silicate flowed from an upward facing face 100 mm in width and 81 mm in height, which was to be the rear face of the carbon-containing refractory, to adjacent faces. Thus, sodium silicate was appropriately wiped off with a fabric, but the amount of sodium silicate wiped off was as small as a negligible amount with respect to the total amount. The coated face substantially solidified 30 minutes after application, and even if the coated face was brought into contact with the coated faces of adjacent bricks, it was not attached to the coated faces. Although the thickness of the adherent layer decreased as a result of drying and the thickness for either sodium silicate aqueous solution decreased by half to about 0.2 mm, the sodium silicate adherent layer (sodium silicate coating film) that covered the entire rear face of the carbon-containing refractory was formed. The refractory having the rear face to which sodium silicate was applied was successfully installed into a molten-steel ladle in a manner identical to that for ordinary refractories.

After the molten-steel ladle was used for one month, partial repair was performed on a deeply eroded region. At this time, a portion of the refractory in the region in which sodium silicate was applied to the rear face and a portion of the refractory in the region in which sodium silicate was not applied to the rear face were collected and examined. In the carbon-containing refractory in the region to which sodium silicate was not applied was oxidized from the rear face to a depth of 20 mm, whereas the oxidation depth from the rear face of the carbon-containing refractory in the region to which sodium silicate was applied was less than 1 mm. That is, it was found that, compared with the region to which sodium silicate was not applied, the oxidation of the rear face of the carbon-containing refractory hardly proceeded in the region to which sodium silicate was applied.

After the molten-steel ladle was used for another month, the same investigation was carries out. As a result, the carbon-containing refractory in the region to which sodium silicate was not applied was oxidized from the rear face to a depth of 30 mm, whereas the oxidation of the rear face of the carbon-containing refractory in the region to which sodium silicate was applied was as deep as less than 1 mm, namely, the oxidation hardly proceeded.

After another month of use, the same investigation was carried out. As a result, the carbon-containing refractory in the region to which sodium silicate was not applied was oxidized from the rear face to a depth of 40 mm, whereas the depth of rear face oxidation of the carbon-containing refractory in about three fourths of the area of the region to which sodium silicate was applied was less than 1 mm, and the depth of rear face oxidation was 10 mm in the remaining about one fourth of the area. In the part where the depth of rear face oxidation was 10 mm, cracks were formed in the sodium silicate adherent layer. These cracks were often observed in the parts in which the application thickness was relatively small. These cracks probably resulted from the difference in expansion coefficient between the carbon-containing refractory and sodium silicate when the molten-steel ladle was cooled and reheated in the second partial repair.

In general, even if cracks are generated in the sodium silicate layer, the durability does not deteriorate when the depth of rear face oxidation is about 10 mm after three months of use. However, in a lining that has a thermal insulating layer between a refractory and a shell outer steel shell to reduce energy loss, the temperature of the rear face of the refractory increases compared with a lining that has no thermal insulating layer, and the depth of rear face oxidation thus may increase to about 20 mm and the durability may deteriorate. Therefore, an experiment in which the application thickness of sodium silicate was generally large was carried out. An aqueous solution of sodium silicate No. 3 and an aqueous solution of sodium silicate No. 4 were each applied in an amount of 2.0 liters, which was twice as large as 1.0 liter to the area of 2.3 $m^2$ in the foregoing example. The calculated application thickness for this amount was 0.8 mm.

After one month of use, a portion of the refractory was collected and examined. As a result, the sodium silicate adherent layer formed by application of the aqueous solution of sodium silicate No. 3 and the aqueous solution of sodium silicate No. 4 as described above was separated from the refractory in a wide region, and the depth of rear face oxidation was about 10 mm. The reason for this was probably that the sodium silicate layer was so thick that the difference in expansion coefficient between the carbon-containing refractory and the sodium silicate adherent layer was not absorbed by the elastoplastic deformation of the sodium silicate adherent layer and, consequently, the contact faces were separated from each other. Therefore, it was found that the thickness of the sodium silicate adherent layer was preferably 0.4 mm or less after drying, and more preferably about 0.2 mm after drying.

In order to make uniform the thickness of the sodium silicate adherent layer, a commercially available aqueous solution of sodium silicate No. 3 (29 mass % of $SiO_2$, 9.5 mass % of $Na_2O$) and a commercially available aqueous solution of sodium silicate No. 4 (24.5 mass % of $SiO_2$, 7.5 mass % of $Na_2O$) were diluted 1.2 times with water to reduce the viscosity and enable thin application and were each applied twice. The fluidity on the coated face disappeared 10 minutes after the first application and hence the second application was performed. The coated face substantially solidified 30 minutes after the second application. Generation of uneven coating which was even visually observed in single application was dramatically reduced by double application.

In the same manner as in the foregoing test, a total of 1.2 liters of a sodium silicate aqueous solution including 1.0 liter of an aqueous solution of sodium silicate No. 3 or an aqueous solution of sodium silicate No. 4 and 0.2 liter of water was applied twice to the rear face (total area: 2.3 m²) of the carbon-containing refractory. The calculated application thickness was 0.5 mm, and the thickness after drying was about 0.2 mm for either sodium silicate aqueous solution. Even after total three months during which the partial repair of the refractory was performed twice after the start of use, the depth of rear face oxidation of the carbon-containing refractory was about 1 mm, and the rear face oxidation was well suppressed.

An investigation was carried out regarding the influence of $SiO_2$ and $Na_2O$ present in sodium silicate, which are known as components that cause changes in properties, such as melting point reduction or expansion and thus significantly degrade the performance, on the refractory for use in applications requiring high refractoriness. As a result, no infiltration of $SiO_2$ and $Na_2O$ into the refractory was observed, which indicates that the fire-resistance performance did not degrade.

Base on the foregoing, it is revealed that the rear face oxidation of the carbon-containing refractory that is used at a high temperature of 400° C. or more and contains 1 mass % of carbon or a carbon compound can be dramatically suppressed without increasing costs and degrading the fire resistance by applying an alkali metal silicate aqueous solution to the rear face of the refractory in an appropriate amount such that the alkali metal silicate aqueous solution exerts substantially no adverse effect on the refractory and no remarkable uneven coating is generated.

Embodiment

Next, a method for suppressing rear face oxidation of a carbon-containing refractory according to an embodiment of the present disclosure will be described based on the foregoing findings.

Figure 1:
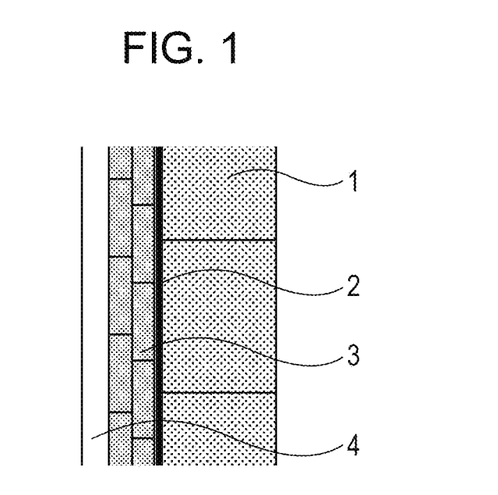
FIG. 1 is a view showing a lining structure of a molten-steel ladle in an iron mill, the lining structure being provided by a method for suppressing rear face oxidation of an embodiment of the present disclosure.

FIG. 1 is a view showing a lining structure of a molten-steel ladle in an iron mill, the lining structure being provided by a method for suppressing rear face oxidation of an embodiment of the present disclosure. In this lining structure, a sodium silicate adherent layer 2 is formed on the rear face side of a carbon-containing refractory 1. The carbon-containing refractory 1 is a wear refractory. The working face of the carbon-containing refractory 1 on the right side of the drawing is to be in contact with molten steel (not shown). The carbon-containing refractory 1 is used at a high temperature of 400° C. or more. Specifically, the working face of the carbon-containing refractory 1 is to be in contact with molten steel of 1550° C. to 1650° C. Two layers of an aluminous permanent lining refractory 3 are provided on the side (on the left side of the drawing) of the sodium silicate adherent layer 2, the side being opposite to the carbon-containing refractory 1. In addition, an outer steel shell 4 is provided on the side of the permanent lining refractory 3 opposite the refractory 1 and the sodium silicate adherent layer 2. A heat insulating sheet may be provided between the permanent lining refractory 3 and the outer steel shell 4.

The sodium silicate adherent layer 2 may be a adherent layer of another alkali metal silicate (e.g., potassium silicate or lithium silicate) and can be formed by, for example, applying an alkali metal silicate aqueous solution to the rear face of the carbon-containing refractory 1 using a brush for painting or the like. The alkali metal silicate aqueous solution preferably has an appropriate viscosity for application at a uniform thickness to the entire rear face of the carbon-containing refractory 1. Specifically, the alkali metal silicate aqueous solution preferably has a viscosity of 10 mPa·s or less. As the viscosity of the aqueous solution increases to more than 10 mPa·s, generation of uneven coating becomes notable, which may cause the absence of the adherent layer in some areas or may cause formation of the adherent layer with an excessively large thickness and thus easy separation of the adherent layer in some areas.

The alkali metal silicate aqueous solution to be used contains an alkali metal oxide $R_2O$ (R is an alkali metal element) and $SiO_2$ such that the molar ratio of $SiO_2$ to the alkali metal oxide is 2.3 or more. When the molar ratio is 2.3 or more, the alkali metal silicate aqueous solution can keep its appropriate viscoelasticity until it dries and solidifies, and hence a coating liquid layer that is thin and has a uniform thickness can be maintained. For example, since the molar ratio for sodium silicate No. 1 is as low as about 2.1, a coating liquid has insufficient viscoelasticity and a coating film formed of the coating liquid is unstable and, as a result, the sodium silicate adherent layer 2 may have defects.

As an alkali metal silicate aqueous solution, for example, at least one of aqueous solutions of sodium silicates No. 2 and No. 3, which are specified in JIS K1408-1966, the sodium silicate No. 4 as previously explained, and a potassium silicate aqueous solution can be used alone or as a mixture. If necessary, the viscosity of these aqueous solutions is adjusted by, for example, dilution with water before use. The typical value of the molar ratio for each sodium silicate is about 2.4 for sodium silicate No. 2, about 3.2 for sodium silicate No. 3, and about 3.4 for sodium silicate No. 4.

The carbon-containing refractory according to the embodiment of the present disclosure having a adherent layer formed by applying the alkali metal silicate aqueous solution having the above molar ratio to the carbon-containing refractory and solidifying the alkali metal silicate aqueous solution has a solid adherent layer of an alkali metal silicate on at least one face that is to be the rear face, which is located opposite the working face during use. The adherent layer contains an alkali metal oxide $R_2O$ (R is an alkali metal element) and $SiO_2$ at a molar ratio of $SiO_2$ to the alkali metal oxide of 2.3 or more.

The sodium silicate adherent layer 2 is formed as a result of solidification about 30 minutes after application of the aqueous solution. The carbon-containing refractory 1 is preferably installed into a molten-steel ladle after the adherent layer of the sodium silicate aqueous solution solidifies and loses fluidity. The same applies to the case of using an aqueous solution of an alkali metal silicate other than sodium silicate. Because of this, the adherent layer of the alkali metal silicate can be prevented from being separated from the refractory with the adherent layer attached to the permanent lining refractory on the rear face side of the carbon-containing refractory. The alkali metal silicate aqueous solution may include at least one of aqueous solutions of sodium silicates No. 2, No. 3, and No. 4, and potassium silicate and may include a mixture of two or more of these aqueous solutions.

The sodium silicate adherent layer 2 preferably has a dry thickness of 0.1 mm or more and 0.4 mm or less. When the dry thickness is 0.1 mm or more, a sufficient effect of suppressing rear face oxidation can be obtained. When the dry thickness is 0.4 mm or less, the influence of the $SiO_2$ and $Na_2O$ present in sodium silicate, namely, changes in properties, such as melting point reduction or expansion, can be reduced and a risk of easy separation of the adherent layer in the case of large temperature changes can also be reduced. Since single application of sodium silicate generates uneven coating, the second application is preferably performed after natural drying for about 30 minutes after the first application. An alkali metal silicate aqueous solution may be applied three or more times. As a method for applying the alkali metal silicate aqueous solution to the carbon-containing refractory 1, in addition to application with a brush, for example, a method for spraying the aqueous solution with a sprayer, a method for transferring the aqueous solution with a roller, and a method for providing a uniform coating thickness by a doctor blade method may be used alone or in combination for application. The method for applying the alkali metal silicate aqueous solution to the carbon-containing refractory 1 is not limited to these.

According to the embodiments of the present disclosure, the alkali metal silicate aqueous solution is used as a material to be applied to the rear face of the carbon-containing refractory 1 that is used at a high temperature of 400° C. or more and contains 1 mass % or more of carbon or a carbon compound. When the alkali metal silicate aqueous solution is applied to the rear face of the carbon-containing refractory 1 and is dried (solidified), a adherent layer, namely, a coating layer which is amorphous, and has few cracks and pores in the temperature region from ordinary temperature to high temperature, can be formed, providing a great effect of suppressing rear face oxidation.

An alkali metal silicate aqueous solution, which is liquid, is easy to obtain and apply and naturally dries and solidifies at ordinary temperature. Therefore, there is no need for a special process and costs can be reduced compared with methods in the related art.

By applying the alkali metal silicate aqueous solution to the rear face of the carbon-containing refractory 30 minutes or more before installation of the refractory into a facility, such as a molten-steel ladle, the adherent layer (coating layer) of the alkali metal silicate hardens well on and adheres to the rear face of the carbon-containing refractory. As a result, the adherent layer (coating layer) of the alkali metal silicate can be prevented from adhering more strongly to the permanent lining refractory and the mortar or the like that fills joints in the permanent lining refractory, than to the carbon-containing refractory. Consequently, even when the refractory shrinks as a result of cooling associated with interruption of operation after the start of use, the loss of airtightness due to separation of the adherent layer (coating layer) of the alkali metal silicate from the refractory can be prevented.

In the region of the carbon-containing refractory 1 where the rear face is oxidized (rear-face oxidized layer), carbon is eliminated by oxidation to cause slag infiltration and decreased strength of the refractory component, leading to a significant decrease in durability. Therefore, repairing by performing dismantling and reinstallation is required before the region where the rear face is oxidized (rear-face oxidized layer) is exposed as the working face. Conventionally, dismantling is performed when the rear face side of the refractory is oxidized to a depth of about 40 mm, namely, when the thickness of the rear-face oxidized layer is 40 mm and the residual thickness of the total refractory is about 50 to 60 mm. However, when a measure to suppress rear face oxidation according to the present disclosure is taken, the refractory can be used until the thickness of the refractory decreases to about 20 mm, which is the structural limit, and the number of times of use until the refractory wears can increase about 30 percent.

The alkali metal silicate aqueous solution forms an amorphous adherent layer (coating layer) in the temperature region from ordinary temperature to high temperature and thus provides high airtightness and a great effect of suppressing rear face oxidation. Furthermore, since utilities such as gas for purge are not required during use, running costs are low and application to refractory of a movable transfer container is possible.

By applying the alkali metal silicate aqueous solution to the rear face of the refractory 30 minutes or more before installation of the refractory into a facility, the adherent layer (coating layer) of the alkali metal silicate can be prevented from being separated from the refractory with the adherent layer attached to the permanent lining refractory and the like.

The alkali metal silicate aqueous solution is applied to the rear face of the refractory such that the adherent layer (coating layer) of the alkali metal silicate obtained by double application has a dry thickness of 0.1 mm or more and 0.4 mm or less. Such application avoids decreased airtightness due to cracks, even at increased temperature of the rear face due to the thermal insulation on the rear face side of the carbon-containing refractory 1, or even for long-term use, and can maintain well an effect of suppressing rear face oxidation. The alkali metal silicate aqueous solution may be applied three or more times.

Although an example in which the present disclosure is applied to the lining structure of the molten-steel ladle is described above, the present disclosure is not limited to this. Any carbon-containing refractory for use in facilities in which the internal temperature reaches a high temperature of 400° C. or more, such as a melting furnace and a heating furnace, may be installed into any facility.

Example 1

A verification study was carried out by using a lining structure shown in FIG. 1. The working face of a carbon-containing refractory 1 in the lining structure used in Example 1 is to be in contact with molten steel of 1550° C.

to 1650° C. The carbon-containing refractory 1 used had a thickness of 150 mm and the following composition: 80 mass % of alumina, 10 mass % of magnesia, and 7 mass % of a carbon material, with the balance being a binder, such as a resin, and unavoidable impurities. A sodium silicate adherent layer 2 was formed by applying a commercially available aqueous solution of sodium silicate No. 3 containing 29 mass % of $SiO_2$ and 9.5 mass % of $Na_2O$ to the carbon-containing refractory 1 using a brush for painting.

The sodium silicate adherent layer 2 solidified 30 minutes after its application and lost fluidity. In this state, the carbon-containing refractory 1 was installed into a molten-steel ladle. The thickness of the sodium silicate adherent layer 2 was 0.4 mm at the time of application and 0.2 mm after drying. Two layers of an aluminous permanent lining refractory 3 each having a thickness of 30 mm were provided on the inner side of the outer steel shell 4, 38 mm in thickness, of the molten-steel ladle, namely, on the side closer to the center of the molten-steel ladle. On the inner side of the aluminous permanent lining refractory 3, the carbon-containing refractory 1 serving as a wear refractory was installed in a stacking manner, with the sodium silicate adherent layer 2 in contact with the aluminous permanent lining refractory 3.

The molten-steel ladle having this lining structure was operated for three months. Specifically, molten steel taken out of a converter (not shown) was held in the molten-steel ladle for about 3 hours and then kept on standby for two hours. This operation was repeated. After about one month, the molten-steel ladle was cooled for partial repair of another part, and the molten-steel ladle was reheated after about four days and started to be used again. When the residual thickness of the carbon-containing refractory 1 was decreased, the carbon-containing refractory 1 was dismantled and the carbon-containing refractory 1 was reinstalled. In such operation, the lining structure was used for three months.

Figure 2:
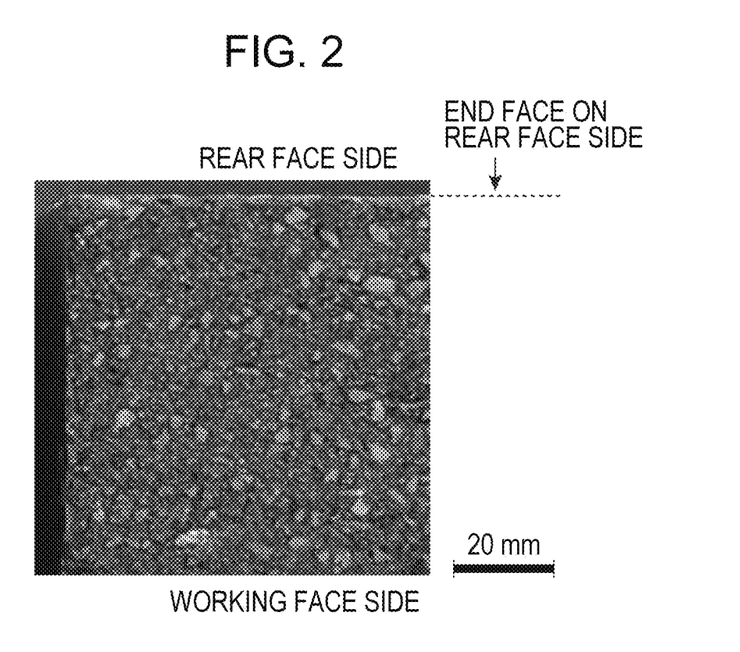
FIG. 2 is a photograph showing an end portion of the rear face side of a refractory provided by the present disclosure in Example 1 after three months of use.

FIG. 2 shows the photograph of an end portion of the rear face side of the carbon-containing refractory 1 after three months. In FIG. 2, white parts are oxidized parts of the carbon-containing refractory 1 (rear-face oxidized layer). As shown in FIG. 2, the rear face oxidation of the carbon-containing refractory 1 provided by the present disclosure is well suppressed.

Figure 3:
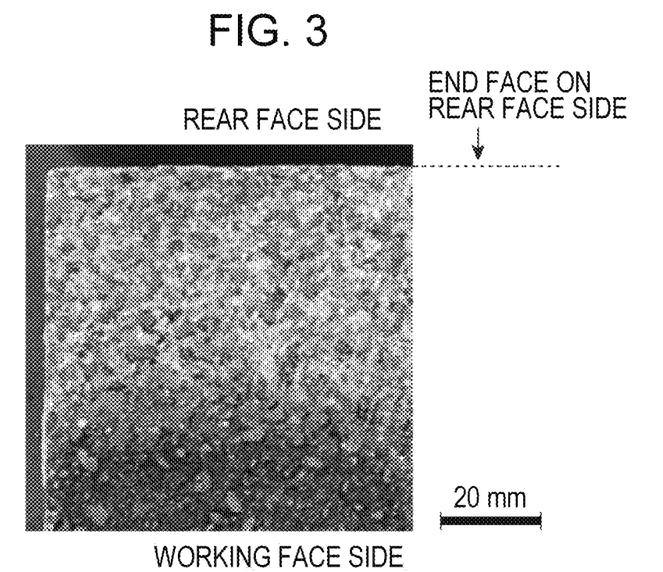
FIG. 3 is a photograph showing an end portion of the rear face side of an exemplary refractory in the related art after three months of use.

As Comparative Example, a lining structure having no sodium silicate adherent layer 2 and obtained by refractory installation according to the related art was used for three months. FIG. 3 shows the photograph of the rear face of the carbon-containing refractory 1 after three months in the lining structure of Comparative Example. In this figure, white parts are also oxidized parts of the carbon-containing refractory 1 (rear-face oxidized layer). As shown in FIG. 3, the rear face oxidation proceeds to a depth of about 40 mm in Comparative Example.

This shows that the rear face oxidation of the carbon-containing refractory 1 can be effectively reduced.

Example 2

Figure 4:
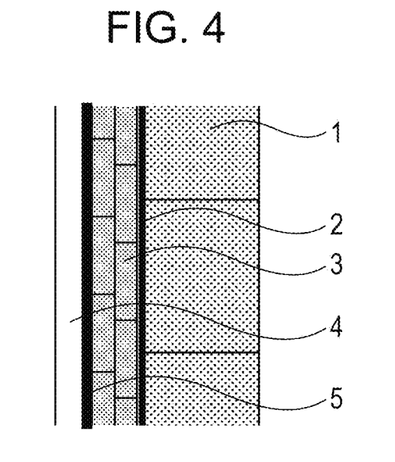
FIG. 4 is a view showing a lining structure of a molten-steel ladle in an iron mill in Example 2.

Subsequently, another verification study was carried out. FIG. 4 is a view showing a lining structure of a molten-steel ladle in an iron mill in Example 2, the lining structure being provided by the method for suppressing rear face oxidation of the present disclosure. In Example 2, a sodium silicate adherent layer 2 was formed on the rear face (on the outer steel shell side) of a carbon-containing refractory 1 as in the first embodiment. Two layers of an aluminous permanent lining refractory 3 were provided on the inner side of an outer steel shell 4 of the molten-steel ladle, namely, on the side closer to the center of the molten-steel ladle, while a heat insulating sheet 5 was interposed between the aluminous permanent lining refractory 3 and the outer steel shell 4. On the inner side of the aluminous permanent lining refractory 3, the carbon-containing refractory 1 serving as a wear refractory was installed in a stacking manner, with the sodium silicate adherent layer 2 in contact with the aluminous permanent lining refractory 3.

The carbon-containing refractory 1 contained 80 mass % of alumina, 10 mass % of magnesia, and 7 mass % of a carbon material, and had a thickness of 150 mm. The thickness of the sodium silicate adherent layer 2 was 0.4 mm at the time of application and 0.2 mm after drying. The permanent lining refractory 3 included two aluminous layers each having a thickness of 30 mm. The thickness of the heat insulating sheet 5 was 5 mm and the thickness of the outer steel shell 4 was 38 mm.

Figure 5:
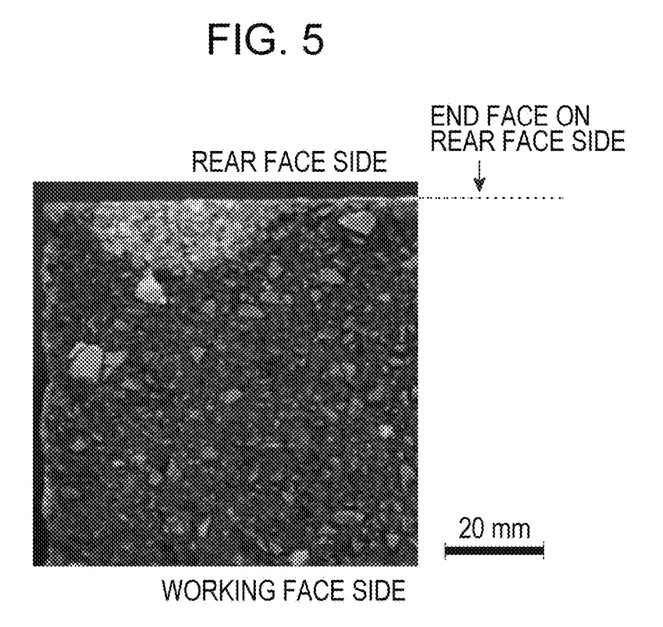
FIG. 5 is a photograph showing an end portion of the rear face side of a refractory provided by the present disclosure in Example 2 after three months of use.

In Example 2, sodium silicate was applied by the same method as that in Example 1. About one month after the start of use, partial rear face oxidation to a depth of about 10 mm as shown in FIG. 5 was observed in about a fourth of the area. The rear face oxidation occurred in areas where the thickness of the sodium silicate adherent layer was not consistent, namely, uneven.

Therefore, a commercially available aqueous solution of sodium silicate No. 3 was diluted 1.2 times by addition of water, such that the fluidity of the aqueous solution of sodium silicate No. 3 increased. This diluted aqueous solution of sodium silicate No. 3 was applied twice to make the thickness uniform. The fluidity on the coated face disappeared 10 minutes after the first application and hence the second application was performed. The coated face substantially solidified 30 minutes after the second application and the refractory was thus installed into a molten-steel ladle. The thickness of the sodium silicate adherent layer 2 that was finally obtained by double application and solidification was 0.2 mm. Regarding the rear face of the refractory after three months of use, the oxidation of the rear face of the refractory hardly proceeded like in FIG. 2 for Example 1.

This shows that double application of sodium silicate reduced generation of uneven coating and improved an effect of inhibiting the rear face oxidation of the carbon-containing refractory 1. The aqueous solution of sodium silicate No. 3 having a relatively high viscosity of 22 mPa·s tended to generate uneven coating. However, when the aqueous solution of sodium silicate No. 3 was diluted 1.2 times dilution with water, the viscosity decreased to 3 mPa·s and generation of uneven coating was dramatically reduced. Since the viscosity of the sodium silicate aqueous solution was found to affect suppression of rear face oxidation, the coating properties and the effect of inhibiting rear face oxidation were studied for aqueous solutions of various type of sodium silicate.

With an aqueous solution of sodium silicate No. 4 having a small viscosity of 2 mPa·s, no uneven coating was generated. Even with an aqueous solution of sodium silicate No. 2 having a viscosity of 13 mPa·s, which was smaller than the aqueous solution of sodium silicate No. 3, uneven coating was generated and partial rear face oxidation occurred. When the aqueous solution of sodium silicate No. 2 was further diluted 1.03 times with water, the viscosity decreased to 10 mPa·s and uneven coating and rear face oxidation were suppressed. Sodium silicate No. 1 had a very large viscosity of 1000 mPa·s or more and it was difficult to apply sodium silicate No. 1 itself. When this sodium silicate No. 1 was diluted 1.5 times with water, the viscosity decreased to 2 mPa·s and no uneven coating was generated, but cracks were generated during drying and rear face oxidation also occurred during use.

This is probably because the molar ratio of $SiO_2$ to $Na_2O$ in sodium silicate No. 1 is 2.1, which is smaller than 2.4 for sodium silicate No. 2, 3.2 for sodium silicate No. 3, and 3.4 for sodium silicate No. 4, and the molecular weight of sodium silicate No. 1 is as low as less than 200 and, consequently, the viscoelasticity is insufficient and the coating film is unstable. It was accordingly found that good oxidation inhibition performance can be obtained when the molar ratio of $SiO_2$ to an alkali oxide $R_2O$ (R is an alkali metal element) is 2.3 or more and the viscosity is reduced to 10 mPa·s or less by, for example, dilution with water.

REFERENCE SIGNS LIST

1 Carbon-containing refractory
2 Sodium silicate adherent layer
3 Permanent lining refractory
4 Outer steel shell
5 Heat insulating sheet

The invention claimed is:

1. A method for suppressing rear face oxidation of a carbon-containing refractory, the method comprising:
   forming an adherent layer on a rear face of a carbon-containing refractory by applying an alkali metal silicate aqueous solution to the rear face and then solidifying the alkali metal silicate aqueous solution,
   the alkali metal silicate aqueous solution containing an alkali metal oxide $R_2O$ (wherein R is an alkali metal element) and $SiO_2$ and the alkali metal silicate aqueous solution having a molar ratio of $SiO_2$ to the alkali metal oxide of 2.3 or more,
   the rear face being located opposite to a working face, and
   the carbon-containing refractory being used at a high temperature of 400° C. or more and containing 1 mass % or more of carbon or a carbon compound.

2. The method for suppressing rear face oxidation of a carbon-containing refractory according to claim 1, wherein the alkali metal silicate aqueous solution has a viscosity of 10 mPa·s or less.

3. The method for suppressing rear face oxidation of a carbon-containing refractory according to claim 1, the method further comprising installing the carbon-containing refractory into a facility 30 minutes or more after completing the application of the alkali metal silicate aqueous solution, the carbon-containing refractory being provided with the solidified alkali metal silicate aqueous solution.

4. The method for suppressing rear face oxidation of a carbon-containing refractory according to claim 1, wherein the alkali metal silicate aqueous solution comprises at least one of sodium silicates No. 2 and No. 3 specified in Japanese Industrial Standard JIS K1408-1966, and sodium silicate No. 4.

5. The method for suppressing rear face oxidation of a carbon-containing refractory according to claim 1, wherein the alkali metal silicate aqueous solution is a potassium silicate aqueous solution.

6. The method for suppressing rear face oxidation of a carbon-containing refractory according to claim 1, wherein the application of the alkali metal silicate aqueous solution is conducted by applying to the rear face of the carbon-containing refractory two or more times.

7. The method for suppressing rear face oxidation of a carbon-containing refractory according to claim 1, wherein the adherent layer of the alkali metal silicate after solidification has a thickness of 0.1 mm or more and 0.4 mm or less.

8. A lining structure comprising:
   a carbon-containing refractory that is used at a high temperature of 400° C. or more and contains 1 mass % or more of carbon or a carbon compound,
   wherein:
      the carbon-containing refractory is provided with, on its rear face, a solid adherent layer of an alkali metal silicate, the rear face being located opposite a working face, and
      a molar ratio of $SiO_2$ present in the alkali metal silicate to an alkali metal oxide $R_2O$ (wherein R is an alkali metal element) present in the alkali metal silicate is 2.3 or more.

9. The lining structure according to claim 8, wherein the solid adherent layer of the alkali metal silicate has a thickness of 0.1 mm or more and 0.4 mm or less.

10. A carbon-containing refractory comprising:
    1 mass % or more of carbon or a carbon compound,
    wherein:
       the carbon-containing refractory has a solid adherent layer of an alkali metal silicate on at least one face that is to be a rear face, which is located opposite to a working face during use, and
       a molar ratio of $SiO_2$ present in the alkali metal silicate to an alkali metal oxide $R_2O$ (wherein R is an alkali metal element) present in the alkali metal silicate is 2.3 or more.

11. The carbon-containing refractory according to claim 10, wherein the solid adherent layer of the alkali metal silicate has a thickness of 0.1 mm or more and 0.4 mm or less.

12. The method for suppressing rear face oxidation of a carbon-containing refractory according to claim 2, the method further comprising installing the carbon-containing refractory into a facility 30 minutes or more after completing the application of the alkali metal silicate aqueous solution, the carbon-containing refractory being provided with the solidified alkali metal silicate aqueous solution.

13. The method for suppressing rear face oxidation of a carbon-containing refractory according to claim 2, wherein the alkali metal silicate aqueous solution comprises at least one of sodium silicates No. 2 and No. 3 specified in Japanese Industrial Standard JIS K1408-1966, and sodium silicate No. 4.

14. The method for suppressing rear face oxidation of a carbon-containing refractory according to claim 3, wherein the alkali metal silicate aqueous solution comprises at least one of sodium silicates No. 2 and No. 3 specified in Japanese Industrial Standard JIS K1408-1966, and sodium silicate No. 4.

15. The method for suppressing rear face oxidation of a carbon-containing refractory according to claim 12, wherein the alkali metal silicate aqueous solution comprises at least one of sodium silicates No. 2 and No. 3 specified in Japanese Industrial Standard JIS K1408-1966, and sodium silicate No. 4.

16. The method for suppressing rear face oxidation of a carbon-containing refractory according to claim 2, wherein the alkali metal silicate aqueous solution is a potassium silicate aqueous solution.

17. The method for suppressing rear face oxidation of a carbon-containing refractory according to claim 3, wherein the alkali metal silicate aqueous solution is a potassium silicate aqueous solution.

18. The method for suppressing rear face oxidation of a carbon-containing refractory according to claim 12, wherein the alkali metal silicate aqueous solution is a potassium silicate aqueous solution.

19. The method for suppressing rear face oxidation of a carbon-containing refractory according to claim 2, wherein the application of the alkali metal silicate aqueous solution is conducted by applying to the rear face of the carbon-containing refractory two or more times.

20. The method for suppressing rear face oxidation of a carbon-containing refractory according to claim 2, wherein the adherent layer of the alkali metal silicate after solidification has a thickness of 0.1 mm or more and 0.4 mm or less.

* * * * *